United States Patent [19]

Brandl et al.

[11] Patent Number: 5,441,548

[45] Date of Patent: Aug. 15, 1995

[54] PROCESS FOR THE PARTIAL OXIDATION OF BITUMINOUS OIL

[75] Inventors: Adrian Brandl, Schwerte; Karl-Heinz Jab, Lünen; Gerd Kronsbein, Dortmund, all of Germany

[73] Assignee: UHDE GmbH, Dortmund, Germany

[21] Appl. No.: 279,630

[22] Filed: Jul. 25, 1994

Related U.S. Application Data

[63] Continuation of Ser. No. 149,003, Nov. 8, 1993, abandoned, which is a continuation of Ser. No. 761,633, Sep. 18, 1991, abandoned.

[30] Foreign Application Priority Data

Oct. 9, 1990 [DE] Germany .................. 40 32 045.6

[51] Int. Cl.$^6$ .............................................. C10J 3/00
[52] U.S. Cl. .................... 48/215; 48/197 R; 48/212; 252/373; 423/648.1
[58] Field of Search ............ 423/650, 648.1; 208/3; 252/373; 48/212, 215, 197 R

[56] References Cited

U.S. PATENT DOCUMENTS

| | | | |
|---|---|---|---|
| 1,927,823 | 9/1933 | Davis et al. | 208/3 |
| 2,981,747 | 4/1961 | Lang et al. | 208/3 |
| 3,044,179 | 7/1962 | Chapman et al. | 48/215 |
| 3,097,081 | 7/1963 | Eastman et al. | 48/215 |
| 3,097,082 | 7/1963 | Guptill | 423/650 |
| 3,232,728 | 2/1966 | Reynolds | 48/215 |
| 3,528,930 | 9/1970 | Schlinger et al. | 48/215 |
| 3,979,188 | 9/1976 | McCallister | 48/215 |
| 4,631,384 | 12/1986 | Cornu | 208/3 |
| 4,946,476 | 8/1990 | Najjar et al. | 252/373 |
| 4,999,029 | 3/1991 | Lueth et al. | 252/373 |
| 5,104,516 | 4/1992 | De Bruijn et al. | 423/650 |

FOREIGN PATENT DOCUMENTS

| | | | |
|---|---|---|---|
| 984649 | 3/1965 | United Kingdom | 48/215 |
| 649218 | 12/1985 | U.S.S.R. | 208/3 |

OTHER PUBLICATIONS

Diversification of Feedstock ADN Production; Recent Trends in the Development of Solid Fuel Gasification Using the Texaco and HTW Process—Jochyen Keller, Fuel Processing Technology 24 (1990) 247-268.

New Opportunity for Fuel Oil in Power Generation; Heavy Residue Gasification Schemes Nelson Brady, a paper presented at the Institute of Petroleum in London on Feb. 19, 1990.

Production, Treatment and Transporation of a New Fuel: Orimulsion TM —I. Layrisse, H. Rivas et al.—A paper presented at 12th International Conference on Slurry Technology—New Orleans, Louisiana Mar. 31 to Apr. 3, 1987.

*Primary Examiner*—Wayne Langel
*Attorney, Agent, or Firm*—Marshall & Melhorn

[57] ABSTRACT

A process for the partial oxidation of bituminous oil emulsions to produce a raw gas containing CO and $H_2$, the process including heating the bituminous oil emulsion to destabilize the emulsion and separating the bituminous oil from the emulsion water, concentrating the emulsion water by evaporation, and reacting in a gasification unit the bituminous oil, the concentrated emulsion water and oxygen or air to produce the raw gas containing mainly CO and $H_2$.

24 Claims, 1 Drawing Sheet

PROCESS FOR THE PARTIAL OXIDATION OF BITUMINOUS OIL

This application is a continuation of application Ser. No. 08/149,003, filed Nov. 8, 1993, abandoned which is a continuation of Ser. No. 07/761,633, filed Sep. 18, 1991, abandoned.

This invention relates to a process for the partial oxidation of bituminous oil emulsion whereby the emulsion is separated, the bituminous oil is preheated to a temperature which adequately reduces its viscosity, and the emulsion water—after concentration—is added to the bituminous oil as an additional moderator for partial oxidation.

BACKGROUND OF THE INVENTION

In the Orinoco Basin, in Trinidad, in North America, and in other areas, deposits of heavy oil and asphalt occur which are noted for their high bitumen content. These natural substances—which resemble oil and are commonly known as bituminous oil—can only be extracted by processes reducing viscosity and not by standard refinery methods. The extraction method currently used in the Orinoco Basin comprises emulsification of the bituminous oil at bed level, extraction of the emulsion, upgrading and transport. During the further processing stage, the saline emulsion water of the primary emulsion is replaced by river water with low salt content. This secondary emulsion can be temporarily stored and transported by pipelines or oil tankers.

Emulsifying the bituminous oils with water brings about a considerable reduction in the viscosity of these oils. The original viscosity in excess of 10000 cP at ambient temperature is reduced to the range of 400 to 1200 cP as a consequence of emulsification. It is only this viscosity-reducing process that permits the extraction, transport and further processing of bituminous oil. The water content of the emulsion is approximately 30% by weight, i.e. 70% by weight bituminous oil.

Owing to this high bitumen content, the bituminous oil cannot be processed by traditional refinery methods.

At present, the bituminous oil emulsion is used to fire power stations. The high sulphur content in bituminous oils (from 3 to 4%) causes a correspondingly high level of environmental pollution—a level which is becoming more and more unacceptable in the industrialized countries. The alternative is to produce desulphurized fuel gas by partial oxidation of bituminous oil emulsion, thus obtaining raw gas mainly consisting of CO and $H_2$. The raw gas is subsequently treated to obtain desulphurized fuel gas suitable for firing combined cycle power plants. Jochen Keller describes the combined cycle power plant—in other words, a gas and steam turbine process with upstream partial oxidation (gasification)—in his article entitled *Diversification of Feedstocks and Products: Recent Trends in the Development of Solid Fuel Gasification Using the Texaco and HTW Process* published in FUEL PROCESSING TECHNOLOGY No. 24 (1990: pp247–268) by Elsevier Science Publishing B. V. Amsterdam. Said report is, however, confined to the gasification of solid fuels.

The partial oxidation of viscous fuels such as mineral oil residues from vacuum distillation units, said oxidation taking place during gasification, is already known and, consequently, gasification is feasible in a combined-cycle power station using viscous fuel. Please consult: L. Nelson & J. Brady *New Opportunities for Fuel Oil in Power Generation: Heavy Residue Gasification Schemes*—a paper presented at the Institute of Petroleum in London on Feb. 19, 1990.

A special kind of viscous fuel is the above-mentioned bituminous oil emulsion, the extractions nd properties of which are discussed by I. Layrisse, H. Rivas et al in *Production, Treatment and Transportation of a New Fuel: Orimulsion* (TM)—in a paper presented at the 12th International Conference on Slurry Technology held in New Orleans, La./USA, from Mar. 31 to Apr. 3, 1987. In addition to CO, $H_2$, $CO_2$ and $CH_4$, the raw gas from the partial oxidation of the bituminous oil emulsion contains one to two percent carbon black—with reference to the oil deployed—and sulphurous ingredients such as $H_2S$ and COS. The carbon black and the sulphurous ingredients are removed by repeated gas scrubbing whereas the purified gas is pressurized and fed as fuel to a gas turbine.

The partial oxidation of bituminous oil emulsion is also suitable for the generation of synthesis gas or hydrogen—in other words, as an intermediate process step for a wide range of chemicals such as methanol, ammonia, oxy-products, formic acid and acetic acid.

The concepts for partial oxidation of bituminous oil are based on the low viscosity of the bituminous oil emulsion which permits pumping and atomizing of the emulsion in a burner currently used for the gasification of oil.

The oil gasification burner guides the reactants—bituminous oil emulsion and oxygen—into the gasification reactor and atomizes the bituminous oil emulsion at the burner mouth due to the high gas flow velocity of the reactants. Atomization is only possible as long as the liquid feedstock possesses a viscosity which does not exceed an average of 2000-3000 cP. The high water content of the bituminous oil emulsion adversely affects the process because the water evaporates in the gasification zone and the vapor is heated to the gasification temperature of 1300°–1500° C. This extra heat requirement causes an additional consumption of oxygen and oil.

OBJECTS OF THE INVENTION

The aim of the invention is to design a process for partial oxidation of bituminous oils that prevents the penetration of a relatively large quantity of emulsion water into the reaction chamber and reducing the specific consumption figures of bituminous oil and oxygen.

It is an object of the present invention to provide a process for the oxidation of a bituminous oil emulsion having a viscosity no higher than about 3000 cP (centipoise measured by Burell-Severs Rheometer at 100° F., 40 psi k=0.2325) with oxygen or air to provide a product gas comprising CO and $H_2$, the processing comprising the steps of:

A. separating a bituminous oil emulsion into bituminous oil and emulsion water,

B. concentrating the emulsion water by removing water,

C. reacting the bituminous oil, the concentrated emulsion water and oxygen to partially oxidize the bituminous oil and provide product gas.

It is an object of the present invention to provide a process that saves power and uses less bituminous oil and oxygen, the process for the partial oxidation of bituminous emulsions to provide a raw gas comprising CO and $H_2$, the process comprising the steps of:

A. feeding a preheated bituminous oil emulsion to an emulsion separator and separating the oil emulsion components to obtain a separated bituminous oil product and a separated emulsion oil water product.

B. evaporating the emulsion oil water product to remove water and provide a concentrated emulsion oil water, C. feeding the bituminous oil product to a gasification unit means, D. feeding the concentrated emulsion oil water with the bituminous oil to the gasification means, and E. reacting the bituminous oil and the concentrated emulsion water, and oxygen to provide raw gases comprising CO and $H_2$.

These and other objects will be apparent from the specification that follows, the appended claims, and the drawings, in which:

DETAILED DESCRIPTION OF THE PREFERRED EMBODIMENT

Figure 1:
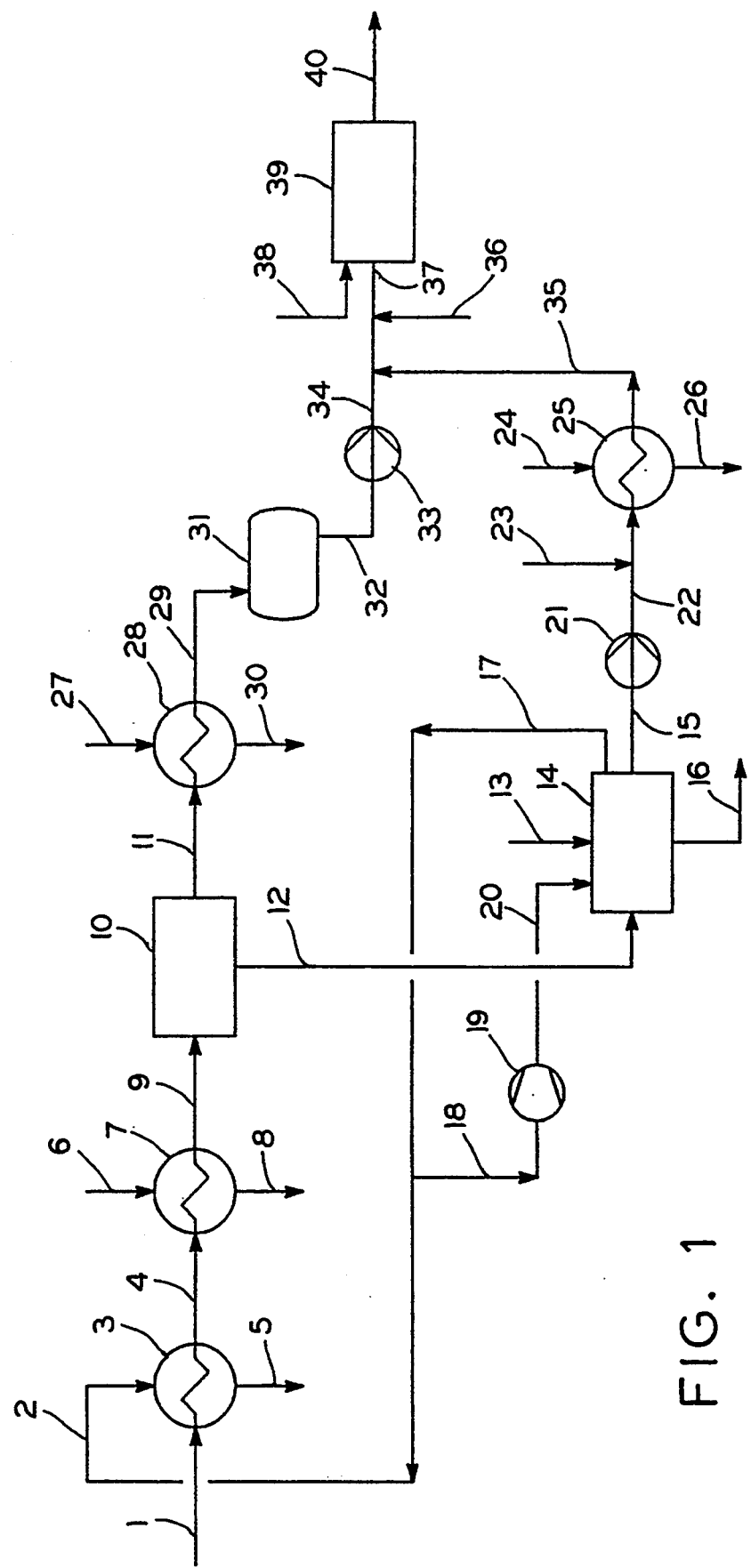
FIG. 1 is a flowsheet of a process for the partial oxidation of bituminous oil emulsions according to the present invention.

The problem of reducing the consumption of bituminous oil and oxygen has been solved because the invention provides for a heating process in which the bituminous oil emulsion is separated into bituminous oil and emulsion water, in which the bituminous oil is further heated to the atomization temperature of the bituminous oil and in which only a portion of the original emulsion water is added as a gasification moderator to the bituminous oil, once the organically impure emulsion water has been concentrated by evaporation. Steam can be utilized as additional moderator. The high thermal requirements for the evaporation of emulsion water are, in this case, not satisfied by additional gasification feedstock but by low-pressure steam which is obtained in every plant for partial oxidation and not suitable for recovery. Low-pressure steam is used to evaporate the emulsion water.

According to the embodiment of the invention, air or oxygen are deployed as oxidizing agent for the partial oxidation of bituminous oil emulsion, the purity grade of oxygen required to optimize the process being within the range of 50% to <99.8% by volume. It is surprising to find that the process according to this invention opens up the possibility of exploiting either air (containing about 20% by volume of oxygen) or oxygen of low purity (50-65%) as oxidizing agent since the fuel bituminous oil has been liberated from its non-combustible ingredient, i.e., the emulsion water.

According to the conception laid down in the invention, the emulsion water bearing heavy hydrocarbons is concentrated and subsequently eliminated by gasification. The high gasification temperature ensures complete oxidation and conversion into CO, $H_2$, $CO_2$ and other simple gas components.

The evaporation of the emulsion water can be taken so far that the quantity of moderator needed for the partial oxidation is greater than that of evaporated emulsion water. In this case, the differential amount can be made up by recycled carbon black bearing water from the plant for partial oxidation or waste water from another plant.

Carbon black is contained in the craw gas as a result of partial oxidation and is removed by scrubbing with water. The water obtained has a low carbon black concentration of about 0.5 to 1.5% by weight. In downstream process stages, the carbon black content can be increased to about 20% in a carbon black/water mixture.

Adding to the optimization of this new process is the fact that the vapors resulting from the evaporation of the emulsion water can be deployed either to preheat the bituminous oil emulsion and/or, once said vapors have been compressed to form low-pressure steam, to evaporate the emulsion water.

The condensates resulting from cooling of the vapors are used as quench water for the hot raw gas emanating from the gasification. Thus, the freshwater requirement for the quenching stage is also reduced.

In fuel gas production plants, an alternative is to utilize the vapor condensates for the saturation of the desulphurized fuel gas, i.e., the input mass flow to a gas turbine is increased in order to use the extra heat at a low temperature level for the generation of electricity or for the reduction of the NOx emissions with the aid of moderated combustion.

In the event of the emulsion water having a high salt content, the water is subjected to desalination which can be carried out upstream or downstream of the evaporation phase. The desalination can be effected by ion exchange, reverse osmosis or electrodialysis.

The bituminous oil separated from the emulsion is preheated to operational temperature, pumped to the partial oxidation unit operating above atmospheric pressure and thus undergoes an increase in pressure. This preheating can take place either before or after pressurization.

FIG. 1 illustrates an embodiment of the invention, and the process is described below:

FIG. 1 shows that the bituminous oil emulsion from pipe 1 is preheated in heat exchanger 3 to 100° C.–130° C. depending on the vapor quantities which are fed from the emulsion water evaporation unit via pipe 2. The preheated emulsion is fed to heat exchanger 7 via pipe 4 and heated generally to about 130° C.–170° C. and preferably to about 140° C.–160° C. with the aid of low-pressure steam via pipe 6. The emulsion now destabilized by the rise in temperature is fed via pipe 9 to emulsion separator 10, which can comprise either a gravity-type emulsion separator or a combination of gravity separator and downstream emulsion separator in the electrostatic field. The bituminous oil with a residual water content of about ½ to 1% up to 3 to 4% is transferred via pipe 11 to the bituminous oil heater 28 heated by medium-pressure steam fed via pipe 27. The bituminous oil, whose outlet temperature is at least about 200° C., and preferably at least about 225° C. to 250° C., is conveyed via pipe 29 to intermediate storage facility 31. The viscosity of the bituminous oil at said temperature is generally lower than about 3000 cP. The hot bituminous oil in pipe 32 is brought to a pressure exceeding the gasification pressure by means of high-pressure pump 33.

The steam condensates are withdrawn from heat exchanger 7 via pipe 8 and from bituminous oil heater 28 via pipe 30.

The emulsion water in pipe 12 flows to the evaporation unit 14 which uses low-pressure steam from pipe 13 at a pressure of about 2 to 5 bar abs. In order to save low-pressure steam, the vapors, or a certain portion of said vapors from the pipes 17 and 18, can be brought to the required feed steam pressure with the help of the vapor compressor 19 and then fed to the evaporation unit via pipe 20.

The vapors, or a certain portion of them from pipe 17, are fed via pipe 2 to preheat the bituminous oil emulsion in heat exchanger 3.

The condensed vapors from pipes 5 and 16 are utilized to quench the hot raw gas obtained during partial oxidation.

The evaporated emulsion water withdrawn via line 15 is pressurized by high-pressure pump 21 so that its pressure is above that of gasification. The concentrated emulsion water is conveyed via pipe 22 to emulsion water heater 25 and heated to a temperature of more than about 200° C., using medium-pressure steam via pipe 24. The steam condensate is withdrawn via pipe 26. The concentrated emulsion water is piped via pipe 35 to line 34 conveying bituminous oil and added, the mixture being fed gasifier 39. Said emulsion water is utilized both as moderator in the gasification step to limit the gasification temperature and as an oil atomizing agent encouraging rapid evaporation at burner mouth where the temperature exceeds generally about 1300° C., and preferably 1350° C. up to about 1400° C. or 1500° C. Thanks to the heating of the concentrated emulsion water, the consumption of oxidizing agents is reduced and the cooling of bituminous oil avoided.

The partial oxidation of bituminous oil is performed in the gasification unit 39. The bituminous oil (via pipe 34), the emulsion water as moderator (via pipe 35) and oxygen or air (via pipe 38) are fed into the gasification chamber via the gasification burner. At the burner outlet, the reactants are atomized and mixed, the exothermic partial oxidation taking place between 1300° C. and 1500° C. The pressure of gasification is generally about 10 to 90 bar, and preferably about 40 to 70 bar. The raw gas in pipe 40 mainly consists of CO and $H_2$; other ingredients are $CO_2$, $CH_4$, $H_2O$, $H_2S$, COS, $N_2$ and Ar.

Another embodiment provides for high-pressure steam added via pipe 36 to the hot bituminous oil in pipe 34 in addition to the evaporated emulsion water from pipe 35; this is feasible if a change in the properties of the carbon black obtained in gasification unit 39 is required.

A further embodiment provides for the following: either the recycled carbon black-bearing water suspension from the quench section of the gasification unit or the waste water, which is difficult to dispose of, is added as gasification moderator to the residual emulsion water via pipe 23. In this case, the evaporation of the emulsion water is taken so far that the required overall quantity of moderator water from pipe 35 exceeds the amount of evaporated emulsion water from pipe 15. The required differential amount of water is compensated via pipe 23. Should the carbon black-bearing water suspension be piped via line 23, it can be fed to the gasification unit either as diluted suspension or as carbon black slurry.

The enclosed Table A reflects different embodiments of this invention: processes Ia and Ib, as well as state-of-the-art process designated "Process II", the previous level of technology.

Embodiments of this invention related to partial oxidation of bituminous oil emulsion by means of evaporation of the emulsion water:

Ia: The quantity of evaporated emulsion water, pipe 15, corresponds to the required amount of moderator, pipe 35.

Ib: The quantity of evaporated emulsion water, pipe 15, is less than the required amount of moderator, pipe 35. The required difference is recycled carbon-black-bearing water suspension or waste water, pipe 23.

Table A reveals that the gasification of bituminous oil emulsion causes a considerable extra consumption if compared to the gasification of bituminous oil and evaporated emulsion water for the generation of the same quantity of useful gas, CO and $H_2$.

5% more bituminous oil, 16.3% more oxygen and correspondingly more electrical energy for the generation of high-pressure oxygen.

Given an energy assessment of the consumption figures based on the electric current which could be specifically generated:

—for saturated steam: 0.12 MW el./t steam
—for bituminous oil: 4.4 MW el./t oil

The saved power amounts to 10.4 MWh/h when implementing the process of partial oxidation of bituminous oil on the basis of the invention as opposed to the partial oxidation of bituminous oil emulsion.

TABLE A

THE PARTIAL OXIDATION OF BITUMINOUS OIL (I) COMPARED TO THE PARTIAL OXIDATION OF BITUMINOUS OIL EMULSION (II)

|  | Unit | Pipe | PARTIAL OXIDATION OF BITUMINOUS OIL Var. Ia | PARTIAL OXIDATION OF BITUMINOUS OIL Var. Ib | PARTIAL OXIDATION OF BITUMINOUS OIL EMULSION II |
|---|---|---|---|---|---|
| Gasification feedstock | | | | | |
| Bituminous oil emulsion | t/h | 1 | 61.4 | 61.4 | 64.5 |
| - bituminous oil | t/h | 1 | 43.0 | 43.0 | 45.15 |
| - emulsion water | t/h | 1 | 18.4 | 18.4 | 19.35 |
| Evap. emulsion water | t/h | 15 | 9.7 | 2.5 | — |
| Carbon-black-bearing water or waste water | t/h | 23 | — | 7.2 | — |
| Oxygen 100% | kmol/h | 38 | 1431.7 | 1431.7 | 1665.7 |
| Oxygen purity | Mol. % | | 99.5 | 99.5 | 99.5 |
| Generation | | | | | |
| CO + $H_2$ | $Nm^3/h$ | | 114800 | 114800 | 114800 |
| Requirements for emulsion separation | | | | | |
| LP steam 5 bar (abs.) | t/h | 13 | 7.9 | 8.4 | — |
| LP steam 8 bar (abs.) | t/h | 6 | 3.6 | 1.7 | — |
| MP steam 20 bar (abs.) | t/h | 24.2 | 73.8 | 3.8 | — |

TABLE A-continued

THE PARTIAL OXIDATION OF BITUMINOUS OIL (I)
COMPARED TO THE PARTIAL OXIDATION
OF BITUMINOUS OIL EMULSION (II)

|  | Unit | Pipe | PARTIAL OXIDATION OF BITUMINOUS OIL | | PARTIAL OXIDATION OF BITUMINOUS OIL EMULSION |
|---|---|---|---|---|---|
|  |  |  | Var. Ia | Var. Ib | II |
| Elec. energy Vapour compression | kWh/h | — | — | 210 | — |
| Extra consumption of electric power for generation of $O_2$ | kWh/h | — | — | — | 2800 |

(calculated for a gasification pressure of 65 bar abs.)

What is claimed is:

1. Process for the partial oxidation of bituminous oil of secondary bituminous oil emulsions by means of oxygen or air, characterized in that the bituminous oil emulsion is separated into bituminous oil and emulsion water using heat and separation techniques to separate the oil and water, concentrating the separated emulsion water and using the concentrating water as moderator for the partial oxidation of bituminous oil.

2. Process according to claim 1, characterized in that, as the result of more intensive evaporation, the amount of evaporated emulsion water is smaller than the moderator quantity necessary for partial oxidation of bituminous oil and in that said difference to be compensated is recycled carbon black-bearing water or waste water.

3. Process according to claim 2, characterized in that the carbon black concentration in the water suspension is 0.5% to 20%.

4. Process according to claim 1, characterized in that steam is deployed as additional moderator.

5. Process according to claim 1, characterized in that the vapors which form during evaporation of emulsion water are utilized for preheating of the secondary bituminous oil emulsion and the evaporation of emulsion water.

6. Process according to claim 5, characterized in that the vapor condensates obtained by cooling of the vapors during evaporation of the emulsion water are used as quench water for cooling the raw gas resulting from partial oxidation.

7. Process according to claim 6, characterized in that the vapor condensate is deployed as make-up water for saturating the fuel gas produced.

8. Process according to claim 1, characterized in that the concentrated water is subjected to desalination and then deployed as moderator for the partial oxidation process.

9. Process according to claim 1, characterized in that the preheating of the bituminous oil is carried out both upstream and downstream of pressurization.

10. A process for the partial oxidation of bituminous oil in secondary bituminous oil emulsions to provide a raw gas comprising CO and $H_2$, the process comprising the steps of:

(A) feeding a preheated secondary bituminous oil emulsion to an emulsion separator and separating the oil emulsion components to obtain a separated bituminous oil product and a separated emulsion oil water product, (B) evaporating the emulsion oil water product to remove water and provide a concentrated emulsion oil water, (C) feeding the bituminous oil product to a gasification unit means, (D) feeding the concentrated emulsion oil water with the bituminous oil to the gasification means, and (E) reacting the bituminous oil and the concentrated emulsion water and oxygen to provide raw gases comprising CO and $H_2$.

11. A process for the partial oxidation of a bituminous oil in a secondary bituminous oil emulsion, the secondary emulsion having a viscosity no higher than about 3000 cP, with oxygen or air to provide a product gas comprising CO and $H_2$, the process comprising the steps of:

A. separating a bituminous oil emulsion into bituminous oil and emulsion water,

B. concentrating the emulsion water by removing water,

C. reacting the bituminous oil, the concentrated emulsion water and oxygen to partially oxidize the bituminous oil and provide product gas.

12. A process as defined in claim 11 in which the secondary bituminous oil emulsion has a water content of about 25 to 30%.

13. A process as defined in claim 12 in which the bituminous oil separated in Step A has about 1 to 3% by weight of water.

14. A process as defined in claim 11 in which the reacting in Step C is performed at about 1300° C. to 1500° C. and pressure of about 10 to 90 bar.

15. A process as defined in claim 11 in which the bituminous oil and concentrated emulsion water, prior to reacting in Step C, have a temperature of at least about 200° C.

16. A process as defined in claim 11 in which the separating in step A is at a temperature of about 140° C. to 160° C. that destabilizes the bituminous oil emulsion.

17. A process as defined in claim 11 in which product gas produced in Step C contains CO, $H_2$, $CO_2$, $H_2O$, $H_2S$, $N_2$, Ar and carbon black.

18. A process as defined in claim 11 in which water containing carbon black is also used as a reactant in reacting Step C.

19. A process for the partial oxidation of bituminous oil in a secondary oil emulsion, the secondary emulsion being an oil in water emulsion having a viscosity of no higher than about 3000 cP and a water content of about 30% by weight; the process comprising the steps of:

A. separating the secondary emulsion into bituminous oil and emulsion water;

B. concentrating the emulsion water by removing water;

C. reacting the bituminous oil of step A and the concentrated water of step B with oxygen at about 1300° C. to 1500° C. at a pressure of about 10 to 90 bar to provide product gas comprising CO, $H_2$, and $CO_2$.

20. A process as defined in claim 19 in which the step (A) separating is performed by gravity.

21. A process as defined in claim 20 in which the step (A) separating is by gravity and subsequently by electrostatic field separation.

22. A process as defined in claim 19, in which the secondary emulsion has a viscosity of 400 to 1200 cP.

23. A process as defined in claim 19, in which the viscosity of the secondary emulsion is 1200 cP.

24. A process for the partial oxidation of a bituminous oil emulsion that is an oil in water emulsion having a viscosity of about 400 to 1200 cP and a water content of about 30% by weight; the process comprising the steps of:

A. separating the emulsion into bituminous oil and emulsion water;

B. concentrating the emulsion water by removing water; and

C. reacting the bituminous oil of step A and the concentrated water of step B with oxygen at about 1300° C. to 1500° C. at a pressure of about 10 to 90 bar to provide product gas comprising CO, $H_2$, and $CO_2$.

* * * * *